United States Patent
Hsieh et al.

(10) Patent No.: US 10,142,537 B2
(45) Date of Patent: Nov. 27, 2018

(54) MOTOR CONTROL METHOD, MOTOR CONTROL DEVICE AND CAMERA

(71) Applicant: VIVOTEK INC., New Taipei (TW)

(72) Inventors: Kuo-Yeh Hsieh, New Taipei (TW); Yi-Cing Kuo, New Taipei (TW)

(73) Assignee: VIVOTEK INC., New Taipei (TW)

( * ) Notice: Subject to any disclaimer, the term of this patent is extended or adjusted under 35 U.S.C. 154(b) by 180 days.

(21) Appl. No.: 14/973,747

(22) Filed: Dec. 18, 2015

(65) Prior Publication Data

US 2016/0205316 A1 Jul. 14, 2016

(30) Foreign Application Priority Data

Jan. 8, 2015 (TW) .............................. 104100561 A (51) Int. Cl.
*H04N 5/232* (2006.01)
*G05B 19/402* (2006.01)
*H04N 5/225* (2006.01)
*G05D 3/00* (2006.01)

(52) U.S. Cl.
CPC ....... *H04N 5/23216* (2013.01); *G05B 19/402* (2013.01); *G05D 3/00* (2013.01); *H04N 5/2259* (2013.01); *H04N 5/23203* (2013.01); *H04N 5/23296* (2013.01); *G05B 2219/41329* (2013.01)

(58) Field of Classification Search
CPC ............. H04N 5/23216; H04N 5/2259; H04N 5/23203; H04N 5/23296; G05B 19/402; G05B 2219/41329; G05D 3/00
See application file for complete search history.

(56) References Cited

U.S. PATENT DOCUMENTS

| 7,643,066 | B2 | 1/2010 | Henninger, III |
| 7,839,431 | B2 | 11/2010 | Swarr |
| 2010/0165116 | A1 | 7/2010 | Hsieh |
| 2014/0267706 | A1 | 9/2014 | Springer |
| 2015/0015731 | A1* | 1/2015 | Zhuang ............. H04N 5/23206 348/211.3 |

FOREIGN PATENT DOCUMENTS

| CN | 101755457 | 6/2010 |
| TW | 201024899 | 7/2010 |
| TW | 201134196 | 10/2011 |

* cited by examiner

*Primary Examiner* — Lin Ye
*Assistant Examiner* — Fayez A Bhuiyan
(74) *Attorney, Agent, or Firm* — Winston Hsu (57) ABSTRACT

A motor control method includes steps of receiving a plurality of control commands through an input unit; driving a motor module to control a moving mode of an object according to the control commands by a processing unit, such that the motor module generates a plurality of coordinate information relative to the moving mode; collecting the control commands from the input unit and collecting the coordinate information from the motor module by the processing unit; and driving the motor module to reproduce the moving mode of the object according to the control commands and the coordinate information by the processing unit.

20 Claims, 3 Drawing Sheets

MOTOR CONTROL METHOD, MOTOR CONTROL DEVICE AND CAMERA

BACKGROUND OF THE INVENTION

1. Field of the Invention

The invention relates to a motor control method, a motor control device and a camera, more particularly, to a motor control method, a motor control device and a camera capable of reproducing a moving mode of an object.

2. Description of the Prior Art

As security-conscious is raised gradually, people pay more and more attention on surveillance application. Most of the conventional Pan Tilt Zoom (PTZ) cameras are capable of recording and reproducing control operation and moving trajectory, such that a user can set a plurality of commands for the PTZ camera, so as to control and record a moving mode of the PTZ camera and then reproduce the moving mode performed by the user. In general, the PTZ camera utilizes a motor module to drive an image sensor to move. A motor of the motor module usually comprises a plurality of internal information including acceleration, deceleration, motor rotor phase record, motor resonance section avoidance, and so on and the internal information of different motor modules may be different. Accordingly, for different motor modules, it is necessary to develop different algorithms for implementing recording and reproducing functions. In other words, since the prior art has to customize different algorithms for implementing recording and reproducing functions for different motor modules, an algorithm for a specific motor module is non-transplantable and cannot be applied to other motor modules.

SUMMARY OF THE INVENTION

An objective of the invention is to provide a motor control method, a motor control device and a camera capable of reproducing a moving mode of an object, so as to solve the aforesaid problems.

According to an embodiment of the invention, a motor control method comprises steps of receiving a plurality of control commands through an input unit; driving a motor module to control a moving mode of an object according to the control commands by a processing unit, such that the motor module generates a plurality of coordinate information relative to the moving mode; collecting the control commands from the input unit and collecting the coordinate information from the motor module by the processing unit; and driving the motor module to reproduce the moving mode of the object according to the control commands and the coordinate information by the processing unit.

According to another embodiment of the invention, a motor control device comprises an input unit, a motor module and a processing unit, wherein the processing unit is electrically connected to the input unit and the motor module. The input unit, the motor module and the processing unit are used for executing the aforesaid motor control method.

According to another embodiment of the invention, a camera comprises an image sensor, an input unit, a motor module and a processing unit, wherein the processing unit is electrically connected to the input unit and the motor module. The input unit, the motor module and the processing unit are used for executing the aforesaid motor control method, so as to take the image sensor to be an object and control or reproduce a moving mode of the image sensor.

As mentioned in the above, the invention collects the control commands (e.g. a command actuating time, a command executing time, a moving speed and/or a moving direction) inputted by a user from the input unit and collects the coordinate information (e.g. coordinate information correspond to pan, tilt and/or zoom control command) generated according to the control commands from the motor module, so as to reproduce the moving mode of the object according to the control commands and the coordinate information. Since the invention collects the coordinate information from the motor module and then performs conversion and reproduction according to the control commands and the coordinate information, the invention does not have to rely on all information of the motor and is not limited to be applied to specific motor. Accordingly, the motor control method of the invention is transplantable and can be applied to various different motor modules.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
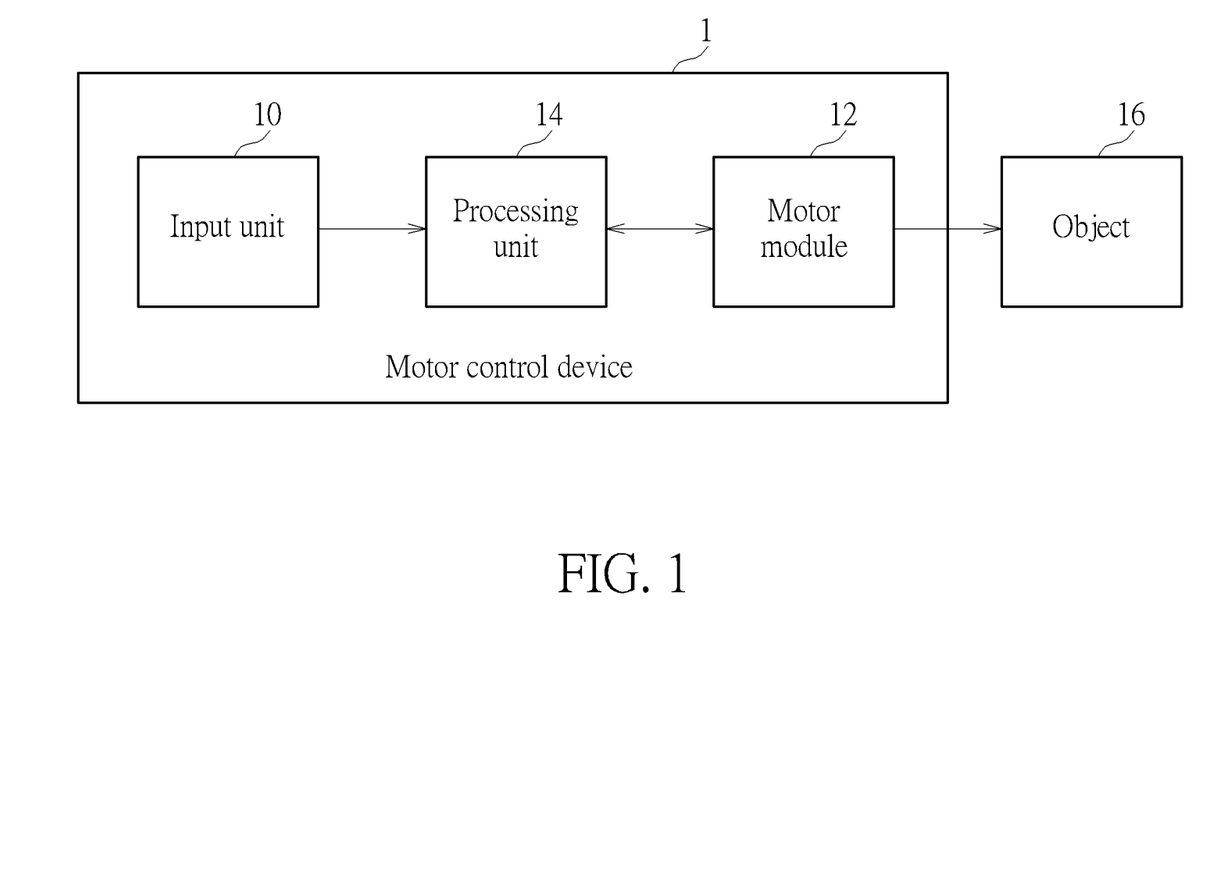
FIG. 1 is a functional block diagram illustrating a motor control device according to an embodiment of the invention.
Figure 2:
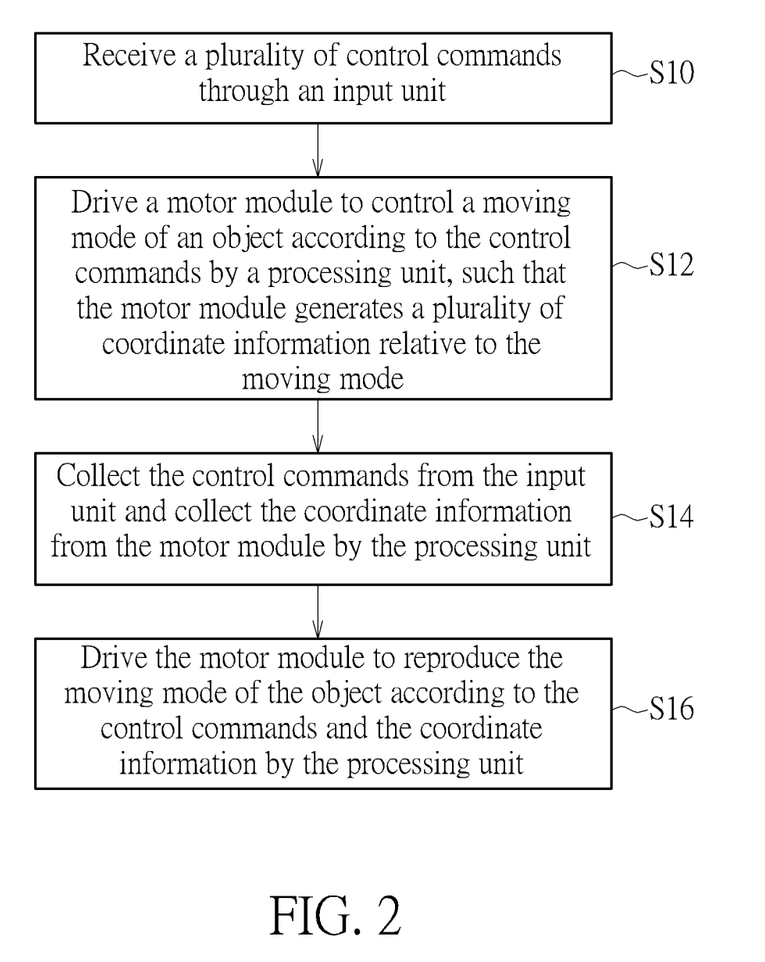
FIG. 2 is a flowchart illustrating a motor control method according to an embodiment of the invention.

Referring to FIGS. 1 and 2, FIG. 1 is a functional block diagram illustrating a motor control device 1 according to an embodiment of the invention and FIG. 2 is a flowchart illustrating a motor control method according to an embodiment of the invention. The motor control method shown in FIG. 2 can be implemented by the motor control device 1 shown in FIG. 1.

As shown in FIG. 1, the motor control device 1 comprises an input unit 10, a motor module 12 and a processing unit 14, wherein the processing unit 14 is electrically connected to the input unit 10 and the motor module 12. In practical applications, the processing unit 14 may be electrically connected to the input unit 10 and the motor module 12 through Internet or circuit design. Furthermore, the motor module 12 is connected to an object 16, such that the motor module 12 can control a moving mode of the object 16. In practical applications, the input unit 14 may be a joystick, a user interface (UI), a keyboard or other input devices, and the processing unit 14 may be a processor or a controller with data processing/calculating function. The motor control device 1 may be applied to a camera, a monitor or other electronic devices with pan, tilt and zoom function. At this time, the object 16 may be an image sensor such as a charge coupled device (CCD) sensor or a complementary metal-oxide-semiconductor (CMOS) sensor, and the motor module 12 can control the moving mode of the object 16 according to pan, tilt and/or zoom control commands inputted by a user. It should be noted that the motor control device 1 may be also applied to other electronic devices, besides the electronic device with image capturing function.

In this embodiment, the processing unit 14 is arranged outside the motor module 12. For example, if the motor module 12 is a motor of a camera with pan, tilt and zoom function, the processing unit 14 may be a system on chip (SoC) of the camera with pan, tilt and zoom function or other processors.

When a user wants to use the motor control device 1 to record and reproduce the moving mode of the object 16, the user can operate the input unit 10 to input a plurality of control commands (e.g. pan, tilt and/or zoom control commands). At this time, the processing unit 14 will receive the control commands inputted by the user through the input unit 10 (step S10 in FIG. 2). Afterward, the processing unit 14 will drive the motor module 12 to control the moving mode of the object 16 according to the control commands, such that the motor module 12 generates a plurality of coordinate information relative to the moving mode (step S12 in FIG. 2). Then, the processing unit 14 will collect the control commands inputted by the user from the input unit 10 and collect the coordinate information generated according to the control commands from the motor module 12 (step S14 in FIG. 2). Then, the processing unit 14 will drive the motor module 12 to reproduce the moving mode of the object 16 according to the control commands and the coordinate information (step S16 in FIG. 2).

In this embodiment, each of the control commands may comprise a command actuating time, a command executing time, a moving speed and/or a moving direction, the processing unit 14 may calculate a moving distance corresponding to each of the control commands according to the coordinate information, and the processing unit 14 may selectively merges some of the control commands and the coordinate information. In the following, different embodiments are used for describing how the processing unit 14 selectively merges some of the control commands and the coordinate information.

Referring to Table 1, Table 1 records 24 control commands and horizontal moving distances and vertical moving distances corresponding to the control commands, wherein the horizontal moving distances and the vertical moving distances are represented by angle.

TABLE 1

| Control command | #1 | #2 | #3 | #4 | #5 | #6 |
|---|---|---|---|---|---|---|
| Horizontal moving distance | 10.422° | 13.716° | 40.23° | 20.088° | 56.97° | 6.318° |
| Vertical moving distance | 2.61° | 2.385° | 6.66° | 2.61° | 4.5° | 0.585° |

| Control command | #7 | #8 | #9 | #10 | #11 | #12 |
|---|---|---|---|---|---|---|
| Horizontal moving distance | 0° | 6.048° | 11.556° | 2.592° | 10.152° | 6.966° |
| Vertical moving distance | 0° | 0.945° | 2.52° | 0.99° | 4.365° | 3.6° |

| Control command | #13 | #14 | #15 | #16 | #17 | #18 |
|---|---|---|---|---|---|---|
| Horizontal moving distance | 6.318° | 4.212° | 0° | 12.096° | 5.454° | 6.264° |
| Vertical moving distance | 3.825° | 2.475° | 0° | 6.3° | 2.7° | 2.115° |

TABLE 1-continued

| Control command | #19 | #20 | #21 | #22 | #23 | #24 |
|---|---|---|---|---|---|---|
| Horizontal moving distance | 2.808° | 1.404° | 4.212° | 7.02° | 5.562° | 8.424° |
| Vertical moving distance | 1.35° | 0.63° | 1.665° | 2.205° | 1.395° | 1.665° |

In this embodiment, the motor module 12 has a delay information, wherein the delay information represents a delay time as the motor module 12 updates the coordinate information every time. For further detailed description, the delay information represents an asynchronous delay time difference between the real coordinate information generated by the motor module 12 and the coordinate information obtained by the processing unit 14 from the motor module 12. Furthermore, the delay information may be obtained as the invention is recording the moving mode. For further detailed description, when the processing unit 14 collects the control commands from the input unit 10 and collects the coordinate information from the motor module 12, the processing unit 14 can calculate the time difference between each control command and the change of corresponding coordinate to obtain the delay information. Moreover, the delay information may be a predetermined value set by the user.

In this embodiment, the processing unit 14 may calculate a delay threshold according to the moving speed of an i-th control command of the control commands and the delay information, wherein i is a positive integer. When the moving distance corresponding to the i-th control command is smaller than the delay threshold, the processing unit 14 merges the i-th control command and an (i+1)-th control command to be a merged command, wherein a moving distance corresponding to the merged command is equal to a sum of the moving distance corresponding to the i-th control command and the moving distance corresponding to the (i+1)-th control command.

For example, provided that the delay information of the motor module 12 is equal to 33 milliseconds, the horizontal moving speed of the tenth control command #10 is equal to 82°/second, and the vertical moving speed of the tenth control command #10 is equal to 34°/second, so the delay threshold of the horizontal moving distance corresponding to the tenth control command #10 is equal to 2.706° obtained by (82°/1000 milliseconds)*33 milliseconds, and the delay threshold of the vertical moving distance corresponding to the tenth control command #10 is equal to 1.122° obtained by (34°/1000 milliseconds)*33 milliseconds. Since the horizontal moving distance 2.592° corresponding to the tenth control command #10 is smaller than the corresponding delay threshold 2.706° and the vertical moving distance 0.99° corresponding to the tenth control command #10 is smaller than the corresponding delay threshold 1.122°, the horizontal moving distance and the vertical moving distance corresponding to the tenth control command #10 cannot be detected dynamically. At this time, the processing unit 14 will ignore the tenth control command #10 and then merge the tenth control command #10 and the eleventh control command #11 to be a merged command, wherein the moving distance corresponding to the merged command is equal to the sum of the moving distance corresponding to the tenth control command #10 and the moving distance corresponding to the eleventh control command #11. Accordingly, the horizontal moving distance corresponding to the merged command is equal to 12.744° obtained by 2.592°+10.152° and the vertical moving distance corresponding to the merged command is equal to 5.355° obtained by 0.99°+ 4.365°.

Furthermore, the processing unit 14 may calculate a moving speed of the merged command by an equation 1 below:

$$V = V_i\left(\frac{A_i}{A_i + A_{i+1}}\right) + V_{i+1}\left(\frac{A_{i+1}}{A_i + A_{i+1}}\right). \quad \text{Equation 1}$$

In equation 1, V represents the moving speed of the merged command, $V_i$ represents the moving speed of the i-th control command, $V_{i+1}$ represents the moving speed of the (i+1)-th control command, $A_i$ represents the moving distance corresponding to the i-th control command, and $A_{i+1}$ represents the moving distance corresponding to the (i+1)-th control command.

For example, provided that the horizontal moving speed of the eleventh control command #11 is equal to 90°/second and the vertical moving speed of the eleventh control command #11 is equal to 30°/second, so the horizontal moving speed of the merged command is equal to 88.372°/second obtained by 82°/second*(2.592°/12.744°+90°/second*(10.152°/12.744° and the vertical moving speed of the merged command is equal to 30.739°/second obtained by 34°/second*(0.99°/5.355°+30°/second*(4.365°/5.355°. Accordingly, the invention can ensure that the moving mode of the object 16 can be reproduced accurately and smoothly.

In the following, the nineteenth control command #19 and the twentieth control command #20 shown in Table 1 are used for description purpose. Provided that the horizontal moving speed of the nineteenth control command #19 is equal to 100°/second and the vertical moving speed of the nineteenth control command #19 is equal to 46°/second, so the delay threshold of the horizontal moving distance corresponding to the nineteenth control command #19 is equal to 3.3° obtained by (100°/1000 milliseconds)*33 milliseconds, and the delay threshold of the vertical moving distance corresponding to the nineteenth control command #19 is equal to 1.518° obtained by (46°/1000 milliseconds)*33 milliseconds. Since the horizontal moving distance 2.808° corresponding to the nineteenth control command #19 is smaller than the corresponding delay threshold 3.3° and the vertical moving distance 1.35° corresponding to the nineteenth control command #19 is smaller than the corresponding delay threshold 1.518°, the horizontal moving distance and the vertical moving distance corresponding to the nineteenth control command #19 cannot be detected dynamically. Provided that the horizontal moving speed of the twentieth control command #20 is equal to 51°/second and the vertical moving speed of the twentieth control command #20 is equal to 23°/second, so the delay threshold of the horizontal moving distance corresponding to the twentieth control command #20 is equal to 1.683° obtained by (51°/1000 milliseconds)*33 milliseconds, and the delay threshold of the vertical moving distance corresponding to the twentieth control command #20 is equal to 0.759° obtained by (23°/1000 milliseconds)*33 milliseconds. Since the horizontal moving distance 1.404° corresponding to the twentieth control command #20 is smaller than the corresponding delay threshold 1.683° and the vertical moving distance 0.63° corresponding to the twentieth control command #20 is smaller than the corresponding delay threshold 0.759°, the horizontal moving distance and the vertical moving distance corresponding to the twentieth control command #20 cannot be detected dynamically.

Since the horizontal moving distance and the vertical moving distance corresponding to the nineteenth control command #19 cannot be detected dynamically, the processing unit 14 will ignore the nineteenth control command #19 and then merge the nineteenth control command #19 and the twentieth control command #20 to be a merged command, wherein the moving distance corresponding to the merged command is equal to the sum of the moving distance corresponding to the nineteenth control command #19 and the moving distance corresponding to the twentieth control command #20. Accordingly, the horizontal moving distance corresponding to the merged command is equal to 4.212° obtained by 2.808°+1.404° and the vertical moving distance corresponding to the merged command is equal to 1.98° obtained by 1.35°+0.63°. Furthermore, according to the aforesaid equation 1, the horizontal moving speed of the merged command is equal to 83.546°/second obtained by 100°/second*(2.808°/4.212°+51°/second*(1.404°/4.212° and the vertical moving speed of the merged command is equal to 38.682°/second obtained by 46°/second*(1.35°/1.98°+23°/second*(0.63°/1.98°. At this time, the delay threshold of the horizontal moving distance corresponding to the merged command is equal to 2.757° obtained by (83.546°/1000 milliseconds)*33 milliseconds, and the delay threshold of the vertical moving distance corresponding to the merged command is equal to 1.276° obtained by (38.682°/1000 milliseconds)*33 milliseconds. Since the horizontal moving distance 4.212° corresponding to the merged command has been larger than the corresponding delay threshold 2.757° and the vertical moving distance 1.98° corresponding to the merged command has been larger than the corresponding delay threshold 1.276°, the merged command can be executed directly.

It should be noted that when the moving speed of the merged command is between two predetermined speeds of the motor module 12, the processing unit 14 may drive the motor module 12 with the predetermined speed close to the moving speed of the merged command. For example, when the moving speed of the merged command is equal to 88.372°/second and the motor module 12 provides only two predetermined speeds of 86°/second and 90°/second, the processing unit 14 may drive the motor module 12 with the predetermined speed 90°/second close to the moving speed 88.372°/second of the merged command.

In another embodiment, when the moving mode of the object 16 is being reproduced by the motor module 12 according to an n-th control command of the control commands and the corresponding coordinate information, the processing unit 14 may calculate a moving threshold according to the moving speed of the n-th control command and the delay information of the motor module 12, wherein n is a positive integer. When a remaining moving distance corresponding to the n-th control command is smaller than the moving threshold, the processing unit 14 will merge the n-th control command and an (n+1)-th control command to be a merged command, wherein a moving distance corresponding to the merged command is equal to a sum of the remaining moving distance corresponding to the n-th control command and the moving distance corresponding to the (n+1)-th control command.

For example, provided that the delay information of the motor module 12 is equal to 33 milliseconds and the horizontal and vertical moving speeds both are 172°/second, so the moving threshold is equal to 5.676° obtained by (172°/1000 milliseconds)*33 milliseconds. Accordingly, when the remaining moving distance corresponding to the n-th control command is smaller than 5.676°, the processing unit 14 has to break off the n-th control command and then merge the n-th control command and the (n+1)-th control command to be a merged command. Provided that the horizontal and vertical moving distances corresponding to the first control command are equal to (20.790°, 16.245°) and the horizontal and vertical moving distances corresponding to the second control command are equal to (1.485°, 1.125°). When the horizontal and vertical moving distances corresponding to the first control command are executed to the remaining moving distance (5.445°, 4.275°), the processing unit 14 will break off the first control command and then merge the first control command and the second control command to be the merged command, wherein the moving distances (6.93°, 5.4°) corresponding to the merged command are equal to the sum of the remaining moving distances (5.445°, 4.275°) corresponding to the first control command and the moving distances (1.485°, 1.125°) corresponding to the second control command. Since the horizontal moving distance 6.93° of the moving distances (6.93°, 5.4°) corresponding to the merged command has been larger than the moving threshold 5.676°, the merged command can be executed directly.

In another embodiment, referring to Table 2, Table 2 records two control commands inputted by the user, wherein each of the control commands comprises horizontal and vertical moving speeds, horizontal and vertical moving directions, and horizontal and vertical moving distances and horizontal and vertical end coordinates corresponding to each of the control commands, wherein the horizontal and vertical moving distances are represented by angle.

TABLE 2

| Control command | C1 | C2 |
| --- | --- | --- |
| Horizontal and vertical moving distances | (15.705°, 1.845°) | (6.48°, 0.45°) |
| Horizontal and vertical moving speeds | (82°/second, 34°/second) | (0°/second, 0°/second) |
| Horizontal and vertical moving directions | (counterclockwise, counterclockwise) | (counterclockwise, counterclockwise) |
| Horizontal and vertical end coordinates | (94.23°, 56.34°) | (100.71°, 56.79°) |

In this embodiment, when the moving speed of a j-th control command of the control commands is equal to zero and the moving distance corresponding to the j-th control command is larger than zero, the processing unit 14 will merge the j-th control command and a (j−1)-th control command to be a merged command, wherein a moving speed of the merged command is equal to the moving speed of the (j−1)-th control command and j is a positive integer. When executing the merged command, the processing unit 14 will drive the motor module 12 to move the object 16 to an end coordinate of the j-th control command with the moving speed of the merged command.

As shown in Table 2, the control commands C1, C2 both are vector moving commands. The horizontal and vertical moving speeds of the second control command C2 both are equal to zero (i.e. the control command C2 is a command of "stop moving") and the horizontal and vertical moving distances of the second control command C2 both are larger than zero, because there is a delay between command execution and coordinate update. At this time, the processing unit 14 will merge the second control command C2 and the first control command C1 to be a merged command and take the horizontal and vertical moving speeds (82°/second, 34°/second) and the horizontal and vertical moving directions of the first control command C1 to be the horizontal and vertical moving speeds and the horizontal and vertical moving directions of the merged command. Afterward, when executing the merged command, the processing unit 14 will drive the motor module 12 to move the object 16 to the horizontal and vertical end coordinates (100.71°, 56.79°) of the second control command C2 with the horizontal and vertical moving speeds (82°/second, 34°/second) and the horizontal and vertical moving directions of the merged command. In other words, the aforesaid operation manner represents that when the processing unit 14 drives the motor module 12 to reproduce the moving mode of the object 16 according to the control commands C1, C2 and the coordinate information, the processing unit 14 merges two vector moving commands C1, C2 to be one single absolute moving command.

Still further, in another embodiment, when the moving distance corresponding to a k-th control command of the control commands is larger than a predetermined threshold, the processing unit 14 will drive the motor module 12 to move the object 16 with the moving speed and the moving direction of the k-th control command, wherein k is a positive integer. After keeping executing the k-th control command until a remaining moving distance corresponding to the k-th control command is smaller than or equal to the moving threshold, the processing unit 14 will drive the motor module 12 to move the object 16 to an end coordinate corresponding to the k-th control command with the moving speed of the k-th control command.

For example, provided that the k-th control command inputted by the user is to move the object 16 from horizontal and vertical initial coordinates (167.58°, 59.805°) to horizontal and vertical end coordinates (79.2°, 59.805°) with the horizontal and vertical moving speeds (172°/second, 0°/second), the corresponding horizontal and vertical moving distances are equal to (448.335°, 0°), and the moving direction is counterclockwise. Furthermore, provided that the delay information of the motor module 12 is equal to 33 milliseconds, so the moving threshold is equal to 5.676° obtained by (172°/1000 milliseconds)*33 milliseconds according to the aforesaid description. Since the k-th control command only controls the object 16 to move horizontally, the predetermined threshold may be set to be an absolute difference between the horizontal initial coordinate and the horizontal end coordinate, i.e. 167.58°−79.2°=88.38°. In another embodiment, the predetermined threshold may be a default value set by the user. Since the horizontal moving distance 448.335° corresponding to the k-th control command is larger than the predetermined threshold 88.38°, the processing unit 14 will drive the motor module 12 to move the object 16 with the moving speed (172°/second, 0°/second) and the moving direction of the k-th control command, wherein the aforesaid moving manner is called as vector moving manner. When the processing unit 14 keeps executing the k-th control command to move the object 16 to the horizontal and vertical current coordinates (84.78°, 59.805°), the difference between the horizontal current coordinate 84.78° and the horizontal end coordinate 79.2° is equal to 5.58° smaller than the moving threshold 5.676°. Therefore, the processing unit 14 will drive the motor module 12 to move the object 16 from the horizontal and vertical current coordinates (84.78°, 59.805°) to the horizontal and vertical end coordinates (79.2°, 59.805°) directly with the horizontal and vertical moving speeds (172°/second, 0°/second) of the k-th control command, wherein the aforesaid moving manner is called as absolute moving manner.

In other words, when reproducing the moving mode of the object 16, the processing unit 14 of the invention may convert one single vector moving command into a combination of one vector moving command and one absolute moving command, so as to ensure that the moving distance and the end position of the object 16 are correct after reproducing the moving mode of the object 16.

It should be noted that the invention may modify at least one of the aforesaid control commands and coordinate information by the processing unit 14, so as to drive the motor module 12 to reproduce the moving mode of the object 16 and ensure that the moving distance and the end position of the object 16 are correct before and after modification. In practical applications, the user may operate the input unit 10 to modify at least one of the aforesaid control commands and coordinate information.

It should be noted that the motor control method of the invention may be implemented by software, firmware and/or hardware. The motor control method may be executed in a camera, a monitor or other electronic devices with pan, tilt and zoom function. Needless to say, the motor control method may be executed in any electronic devices capable of driving an object to move.

Figure 3:
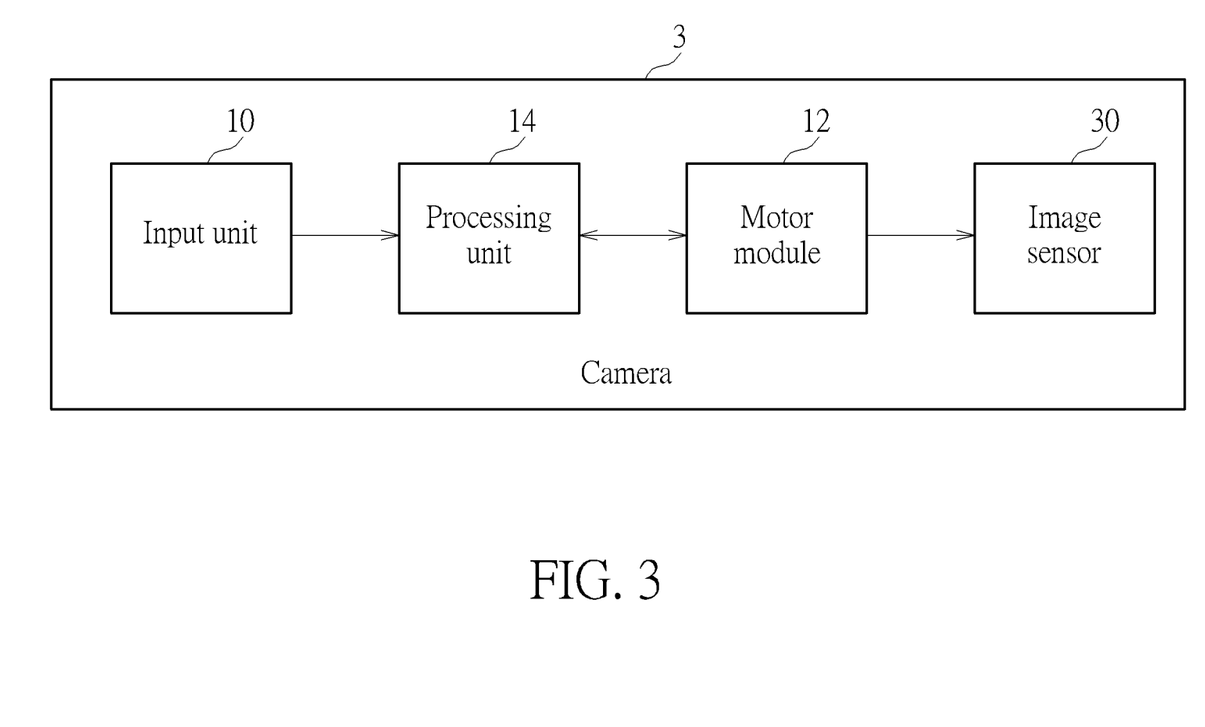
FIG. 3 is a functional block diagram illustrating a camera according to another embodiment of the invention.

Referring to FIG. 3, FIG. 3 is a functional block diagram illustrating a camera 3 according to another embodiment of the invention. As shown in FIG. 3, the camera 3 comprises an image sensor 30, an input unit 10, a motor module 12 and a processing unit 14, wherein the processing unit 14 is electrically connected to the input unit 10 and the motor module 12, and the motor module 12 is connected to the image sensor 30. It should be noted that the input unit 10, the motor module 12 and the processing unit 14 are used for executing the aforesaid motor control method, so as to take the image sensor 30 to be the aforesaid object 16 and control or reproduce the moving mode of the image sensor 30.

As mentioned in the above, the invention collects the control commands (e.g. a command actuating time, a command executing time, a moving speed and/or a moving direction) inputted by a user from the input unit and collects the coordinate information (e.g. coordinate information correspond to pan, tilt and/or zoom control command) generated according to the control commands from the motor module, so as to reproduce the moving mode of the object according to the control commands and the coordinate information. Since the invention collects the coordinate information from the motor module and then performs conversion and reproduction for the control commands and the coordinate information, the invention does not have to rely on all information of the motor and is not limited to be applied to specific motor. Accordingly, the motor control method of the invention is transplantable and can be applied to various different motor modules.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor control method comprising steps of:
   receiving a plurality of control commands through an input peripheral;
   driving a motor module to control a moving mode of an object according to the control commands by a processing unit, such that the motor module generates a plurality of coordinate information relative to the moving mode;
   collecting the control commands from the input peripheral and collecting the coordinate information from the motor module by the processing unit; and
   driving the motor module to reproduce the moving mode of the object according to the control commands and the coordinate information by the processing unit;
   wherein each of the control commands comprises a command actuating time, a command executing time, a moving speed and/or a moving direction, the processing unit calculates a moving distance corresponding to each of the control commands according to the coordinate information, and the processing unit selectively merges some of the control commands and the coordinate information;
   wherein the motor module has a delay information and the step of the processing unit selectively merges some of the control commands and the coordinate information comprises steps of:
   calculating a delay threshold according to the moving speed of an i-th control command of the control commands and the delay information by the processing unit, wherein i is a positive integer; and
   when the moving distance corresponding to the i-th control command is smaller than the delay threshold, merging the i-th control command and an (i+1)-th control command to be a merged command by the processing unit, wherein a moving distance corresponding to the merged command is equal to a sum of the moving distance corresponding to the i-th control command and the moving distance corresponding to the (i+1)-th control command.

2. The motor control method of claim 1, wherein the processing unit calculates a moving speed of the merged command by an equation below:

$$V = V_i \left( \frac{A_i}{A_i + A_{i+1}} \right) + V_{i+1} \left( \frac{A_{i+1}}{A_i + A_{i+1}} \right);$$

wherein V represents the moving speed of the merged command, $V_i$ represents the moving speed of the i-th control command, $V_{i+1}$ represents the moving speed of the (i+1)-th control command, $A_i$ represents the moving distance corresponding to the i-th control command, and $A_{i+1}$ represents the moving distance corresponding to the (i+1)-th control command.

3. The motor control method of claim 2, further comprising step of:
   when the moving speed of the merged command is between two predetermined speeds of the motor module, driving the motor module with the predetermined speed close to the moving speed of the merged command by the processing unit.

4. The motor control method of claim 1, wherein the step of the processing unit selectively merges some of the control commands and the coordinate information comprises steps of:

when the moving speed of a j-th control command of the control commands is equal to zero and the moving distance corresponding to the j-th control command is larger than zero, merging the j-th control command and a (j−1)-th control command to be a merged command by the processing unit, wherein a moving speed of the merged command is equal to the moving speed of the (j−1)-th control command, wherein j is a positive integer; and when executing the merged command, driving the motor module to move the object to an end coordinate of the j-th control command with the moving speed of the merged command by the processing unit.

5. The motor control method of claim 1, further comprising steps of:

calculating a moving threshold according to the moving speed of a k-th control command of the control commands and the delay information by the processing unit, wherein k is a positive integer;

when the moving distance corresponding to the k-th control command is larger than a predetermined threshold, driving the motor module to move the object with the moving speed and the moving direction of the k-th control command by the processing unit; and after keeping executing the k-th control command until a remaining moving distance corresponding to the k-th control command is smaller than or equal to the moving threshold, the processing unit driving the motor module to move the object to an end coordinate corresponding to the k-th control command with the moving speed of the k-th control command.

6. The motor control method of claim 1, wherein the step of the processing unit selectively merges some of the control commands and the coordinate information comprises steps of:

calculating a moving threshold according to the moving speed of an n-th control command of the control commands and the delay information by the processing unit, wherein n is a positive integer; and when a remaining moving distance corresponding to the n-th control command is smaller than the moving threshold, the processing unit merging the n-th control command and an (n+1)-th control command to be a merged command, wherein a moving distance corresponding to the merged command is equal to a sum of the remaining moving distance corresponding to the n-th control command and the moving distance corresponding to the (n+1)-th control command.

7. The motor control method of claim 1, further comprising step of:

modifying at least one of the control commands and the coordinate information by the processing unit, so as to drive the motor module to reproduce the moving mode of the object after modification.

8. A motor control method comprising steps of:

receiving a plurality of control commands through an input peripheral;

driving a motor module to control a moving mode of an object according to the control commands by a processing unit, such that the motor module generates a plurality of coordinate information relative to the moving mode;

collecting the control commands from the input peripheral and collecting the coordinate information from the motor module by the processing unit; and driving the motor module to reproduce the moving mode of the object according to the control commands and the coordinate information by the processing unit;

wherein each of the control commands comprises a command actuating time, a command executing time, a moving speed and/or a moving direction, the processing unit calculates a moving distance corresponding to each of the control commands according to the coordinate information, and the processing unit selectively merges some of the control commands and the coordinate information;

wherein the step of the processing unit selectively merges some of the control commands and the coordinate information comprises steps of:

when the moving speed of a j-th control command of the control commands is equal to zero and the moving distance corresponding to the j-th control command is larger than zero, merging the j-th control command and a (j−1)-th control command to be a merged command by the processing unit, wherein a moving speed of the merged command is equal to the moving speed of the (j−1)-th control command, wherein j is a positive integer; and when executing the merged command, driving the motor module to move the object to an end coordinate of the j-th control command with the moving speed of the merged command by the processing unit.

9. The motor control method of claim 8, wherein the motor module has a delay information and the step of the processing unit selectively merges some of the control commands and the coordinate information comprises steps of:

calculating a delay threshold according to the moving speed of an i-th control command of the control commands and the delay information by the processing unit, wherein i is a positive integer; and when the moving distance corresponding to the i-th control command is smaller than the delay threshold, merging the i-th control command and an (i+1)-th control command to be a merged command by the processing unit, wherein a moving distance corresponding to the merged command is equal to a sum of the moving distance corresponding to the i-th control command and the moving distance corresponding to the (i+1)-th control command;

wherein the processing unit calculates a moving speed of the merged command by an equation below:

$$V = V_i\left(\frac{A_i}{A_i + A_{i+1}}\right) + V_{i+1}\left(\frac{A_{i+1}}{A_i + A_{i+1}}\right);$$

wherein V represents the moving speed of the merged command, $V_i$ represents the moving speed of the i-th control command, $V_{i+1}$ represents the moving speed of the (i+1)-th control command, $A_i$ represents the moving distance corresponding to the i-th control command, and $A_{i+1}$ represents the moving distance corresponding to the (i+1)-th control command.

10. The motor control method of claim 9, further comprising step of:
when the moving speed of the merged command is between two predetermined speeds of the motor module, driving the motor module with the predetermined speed close to the moving speed of the merged command by the processing unit.

11. The motor control method of claim 8, wherein the motor module has a delay information and the motor control method further comprises steps of:
calculating a moving threshold according to the moving speed of a k-th control command of the control commands and the delay information by the processing unit, wherein k is a positive integer;
when the moving distance corresponding to the k-th control command is larger than a predetermined threshold, driving the motor module to move the object with the moving speed and the moving direction of the k-th control command by the processing unit; and
after keeping executing the k-th control command until a remaining moving distance corresponding to the k-th control command is smaller than or equal to the moving threshold, the processing unit driving the motor module to move the object to an end coordinate corresponding to the k-th control command with the moving speed of the k-th control command.

12. The motor control method of claim 8, wherein the motor module has a delay information and the step of the processing unit selectively merges some of the control commands and the coordinate information comprises steps of:
calculating a moving threshold according to the moving speed of an n-th control command of the control commands and the delay information by the processing unit, wherein n is a positive integer; and
when a remaining moving distance corresponding to the n-th control command is smaller than the moving threshold, the processing unit merging the n-th control command and an (n+1)-th control command to be a merged command, wherein a moving distance corresponding to the merged command is equal to a sum of the remaining moving distance corresponding to the n-th control command and the moving distance corresponding to the (n+1)-th control command.

13. The motor control method of claim 8, further comprising step of:
modifying at least one of the control commands and the coordinate information by the processing unit, so as to drive the motor module to reproduce the moving mode of the object after modification.

14. A motor control method comprising steps of:
receiving a plurality of control commands through an input peripheral;
driving a motor module to control a moving mode of an object according to the control commands by a processing unit, such that the motor module generates a plurality of coordinate information relative to the moving mode;
collecting the control commands from the input peripheral and collecting the coordinate information from the motor module by the processing unit; and
driving the motor module to reproduce the moving mode of the object according to the control commands and the coordinate information by the processing unit;
wherein each of the control commands comprises a command actuating time, a command executing time, a moving speed and/or a moving direction, the processing unit calculates a moving distance corresponding to each of the control commands according to the coordinate information, and the processing unit selectively merges some of the control commands and the coordinate information;
wherein the motor module has a delay information and the motor control method further comprises steps of:
calculating a moving threshold according to the moving speed of a k-th control command of the control commands and the delay information by the processing unit, wherein k is a positive integer;
when the moving distance corresponding to the k-th control command is larger than a predetermined threshold, driving the motor module to move the object with the moving speed and the moving direction of the k-th control command by the processing unit; and
after keeping executing the k-th control command until a remaining moving distance corresponding to the k-th control command is smaller than or equal to the moving threshold, the processing unit driving the motor module to move the object to an end coordinate corresponding to the k-th control command with the moving speed of the k-th control command.

15. The motor control method of claim 14, wherein the step of the processing unit selectively merges some of the control commands and the coordinate information comprises steps of:
calculating a delay threshold according to the moving speed of an i-th control command of the control commands and the delay information by the processing unit, wherein i is a positive integer; and
when the moving distance corresponding to the i-th control command is smaller than the delay threshold, merging the i-th control command and an (i+1)-th control command to be a merged command by the processing unit, wherein a moving distance corresponding to the merged command is equal to a sum of the moving distance corresponding to the i-th control command and the moving distance corresponding to the (i+1)-th control command;
wherein the processing unit calculates a moving speed of the merged command by an equation below:

$$V = V_i\left(\frac{A_i}{A_i + A_{i+1}}\right) + V_{i+1}\left(\frac{A_{i+1}}{A_i + A_{i+1}}\right);$$

wherein V represents the moving speed of the merged command, V $A_i$ represents the moving speed of the i-th control command, $V_{i+1}$ represents the moving speed of the (i+1)-th control command, $A_i$ represents the moving distance corresponding to the i-th control command, and $A_{i+1}$ represents the moving distance corresponding to the (i+1)-th control command.

16. The motor control method of claim 14, wherein the step of the processing unit selectively merges some of the control commands and the coordinate information comprises steps of:
calculating a moving threshold according to the moving speed of an n-th control command of the control commands and the delay information by the processing unit, wherein n is a positive integer; and
when a remaining moving distance corresponding to the n-th control command is smaller than the moving threshold, the processing unit merging the n-th control command and an (n+1)-th control command to be a merged command, wherein a moving distance corresponding to the merged command is equal to a sum of the remaining moving distance corresponding to the n-th control command and the moving distance corresponding to the (n+1)-th control command.

17. The motor control method of claim 14, further comprising step of:
modifying at least one of the control commands and the coordinate information by the processing unit, so as to drive the motor module to reproduce the moving mode of the object after modification.

18. A motor control method comprising steps of:
receiving a plurality of control commands through an input peripheral;
driving a motor module to control a moving mode of an object according to the control commands by a processing unit, such that the motor module generates a plurality of coordinate information relative to the moving mode;
collecting the control commands from the input peripheral and collecting the coordinate information from the motor module by the processing unit; and
driving the motor module to reproduce the moving mode of the object according to the control commands and the coordinate information by the processing unit;
wherein each of the control commands comprises a command actuating time, a command executing time, a moving speed and/or a moving direction, the processing unit calculates a moving distance corresponding to each of the control commands according to the coordinate information, and the processing unit selectively merges some of the control commands and the coordinate information;
wherein the motor module has a delay information and the step of the processing unit selectively merges some of the control commands and the coordinate information comprises steps of:
calculating a moving threshold according to the moving speed of an n-th control command of the control commands and the delay information by the processing unit, wherein n is a positive integer; and
when a remaining moving distance corresponding to the n-th control command is smaller than the moving threshold, the processing unit merging the n-th control command and an (n+1)-th control command to be a merged command, wherein a moving distance corresponding to the merged command is equal to a sum of the remaining moving distance corresponding to the n-th control command and the moving distance corresponding to the (n+1)-th control command.

19. The motor control method of claim 18, wherein the step of the processing unit selectively merges some of the control commands and the coordinate information comprises steps of:
calculating a delay threshold according to the moving speed of an i-th control command of the control commands and the delay information by the processing unit, wherein i is a positive integer; and
when the moving distance corresponding to the i-th control command is smaller than the delay threshold, merging the i-th control command and an (i+1)-th control command to be a merged command by the processing unit, wherein a moving distance corresponding to the merged command is equal to a sum of the moving distance corresponding to the i-th control command and the moving distance corresponding to the (i+1)-th control command;
the processing unit calculates a moving speed of the merged command by an equation below:

$$V = V_i\left(\frac{A_i}{A_i + A_{i+1}}\right) + V_{i+1}\left(\frac{A_{i+1}}{A_i + A_{i+1}}\right);$$

wherein V represents the moving speed of the merged command, $V_i$ represents the moving speed of the i-th control command, $V_{i+1}$ represents the moving speed of the (i+1)-th control command, $A_i$ represents the moving distance corresponding to the i-th control command, and $A_{i+1}$ represents the moving distance corresponding to the (i+1)-th control command.

20. The motor control method of claim 18, further comprising step of:
modifying at least one of the control commands and the coordinate information by the processing unit, so as to drive the motor module to reproduce the moving mode of the object after modification.

* * * * *